(12) United States Patent
Sprangle et al.

(10) Patent No.: US 6,799,257 B2
(45) Date of Patent: Sep. 28, 2004

(54) METHOD AND APPARATUS TO CONTROL MEMORY ACCESSES

(75) Inventors: Eric A. Sprangle, Portland, OR (US); Onur Mutlu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 10/079,967

(22) Filed: Feb. 21, 2002

(65) Prior Publication Data

US 2003/0159008 A1 Aug. 21, 2003

(51) Int. Cl.[7] .............................................. G06F 12/00
(52) U.S. Cl. ...................................................... 711/158
(58) Field of Search ................................. 711/158, 137, 711/151

(56) References Cited

U.S. PATENT DOCUMENTS

| | | | |
|---|---|---|---|
| 5,745,913 A | * 4/1998 | Pattin et al. ................. | 711/105 |
| 5,860,106 A | 1/1999 | Domen et al. ............... | 711/137 |
| 5,926,828 A | 7/1999 | Khandekar ................... | 711/111 |
| 5,966,544 A | 10/1999 | Sager ........................... | 712/32 |
| 6,026,465 A | 2/2000 | Mills et al. .................. | 711/103 |
| 6,055,650 A | 4/2000 | Christie ........................ | 714/39 |
| 6,088,772 A | 7/2000 | Harriman et al. ............ | 711/158 |
| 6,094,717 A | 7/2000 | Merchant et al. ............. | 712/32 |
| 6,148,380 A | 11/2000 | Dodd et al. .................. | 711/154 |
| 6,163,838 A | 12/2000 | Merchant et al. ........... | 712/219 |
| 6,182,177 B1 | 1/2001 | Harriman ..................... | 710/112 |
| 6,212,598 B1 | 4/2001 | Jeddeloh ....................... | 711/105 |
| 6,212,626 B1 | 4/2001 | Merchant et al. ........... | 712/218 |
| 6,243,768 B1 | 6/2001 | Khandekar ................... | 710/35 |
| 6,304,953 B1 | 10/2001 | Henstrom et al. ........... | 712/215 |
| 6,484,239 B1 | * 11/2002 | Hill et al. .................... | 711/137 |
| 2002/0023197 A1 | * 2/2002 | Miura et al. ................. | 711/154 |

OTHER PUBLICATIONS

PCT Search Report mailed Jun. 27, 2003, Intenational Application No. PCT/US 03/02169 (6 pages).
PCT Written Opinion mailed Nov. 19, 2003, International Application No. PCT/US03/02169, 8 pages.

* cited by examiner

Primary Examiner—Reginald G. Bragdon
(74) Attorney, Agent, or Firm—Blakely, Sokoloff, Taylor & Zafman LLP

(57) ABSTRACT

A method and apparatus for accessing memory comprising monitoring memory accesses from a hardware prefetcher and determining whether the memory accesses from the hardware prefetcher are used by an out-of-order core. A front side bus controller switches memory access modes from a minimize memory access latency mode to a maximize memory bus bandwidth mode if a percentage of the memory accesses generated by the hardware prefetcher are used by the out-of-order core.

14 Claims, 5 Drawing Sheets

| Inst. Num | Address | Queue Entry | Requested by Core? | Created by HWP? | Predicted DRAM Page Open? | Read from memory? |
|---|---|---|---|---|---|---|
| 10 | 110 | 5 | Y | Y | N | Y |
| 11 | 4 | 3 | Y | Y | N | Y |
| 14 | 116 | 1 | Y | Y | Y | N |
| 15 | 108 | 6 | Y | Y | Y | N |
| 16 | 116 | 7 | Y | Y | Y | Y |
| 20 | 165 | 4 | Y | N | Y | N |
| 22 | 216 | 0 | Y | Y | Y | Y |
| -- | 516 | 2 | N | Y | Y | N |
| 30 | 716 | 8 | Y | N | Y | Y |
| 40 | 316 | 9 | Y | Y | Y | Y |
| 41 | 916 | 11 | Y | Y | Y | Y |
| -- | 416 | 12 | N | Y | Y | Y |

METHOD AND APPARATUS TO CONTROL MEMORY ACCESSES

BACKGROUND OF THE INVENTION

1. Field of the Invention

The present invention is related to the field of electronics. In particular, the present invention is related to a method and apparatus for controlling memory accesses.

2. Description of the Related Art

Dynamic Random Access Memories (DRAMs) have memory precharge, activate, read, and write operations. In particular, a memory controller that addresses a bank of memory must first precharge the memory bank, then the addressed page within the bank must be activated before the addressed column in that page is accessed (read or written). A "DRAM page open" or a "page hit" indicates the memory being accessed has already been precharged and activated, and data may be read or written from the page without having to precharge or activate the memory during each memory access. When a "page miss occurs" (i.e., data is accessed from a page in memory other than from the page that is open), the open page must be written back to the DRAM chip from the sense amps. Next, the new memory page has to first be precharged and activated before being accessed. Writing the old page to DRAM, and precharging and activating the new DRAM pages takes time and slows down memory accesses resulting in an inefficient use of the memory bus (reduced bandwidth) and a loss in performance of an apparatus (e.g., a computer) employing DRAM.

FIG. 1 illustrates a front side bus (FSB) controller that schedules memory accesses according to a prior art embodiment. As illustrated in FIG. 1, the FSB controller 105 includes a FSB scheduler 125 that schedules accesses (reads and writes) from a processor 110 to DRAM 120 via a FSB access queue 130. The FSB controller is coupled to processor 110 via a L2 miss request bus and to memory controller 115 via a front side bus. The memory controller 115 is coupled to DRAM 120 via a memory bus. Processor 110 comprises an out-of-order core 135 and a hardware prefetcher (HWP) 140. The out-of-order core 135 uses a pipelining technique wherein multiple instructions are overlapped in execution in an effort to improve the overall performance of the processor. The HWP prefetches data needed by execution units in the out-of-order core from DRAM.

The FSB controller 105 and in particular the FSB scheduler 125 schedules DRAM accesses from the processor 110 (i.e., from the out-of-order core and from the HWP) based upon the relative age of the instructions that caused the access (i.e., a load or store resulting in a request for reading or writing data to DRAM). Hence the accesses in the FSB access queue 130 are scheduled to DRAM in program order. In particular, DRAM accesses from the out-of-order core have priority over DRAM accesses from the HWP, and accesses generated by the out-of-order core are scheduled in program order. Thus, the FSB controller minimizes the DRAM access latency by first scheduling the accesses associated with the oldest instruction in the FSB access queue. However, scheduling DRAM accesses based upon minimizing the latency of DRAM accesses is not always the optimum solution, as successive DRAM accesses may not always access open DRAM pages. Accesses from a closed DRAM page involve writing the currently open page to DRAM, and precharging and activating a new DRAM page. Thus, accessing a closed DRAM page takes time and slows down memory accesses, thereby rendering the processor's DRAM bus inefficient.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

FIG. 2B illustrates parameters associated with memory accesses according to one embodiment of the invention.

DETAILED DESCRIPTION OF THE INVENTION

Described is a method and apparatus to control memory accesses. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description are presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Figure 1:
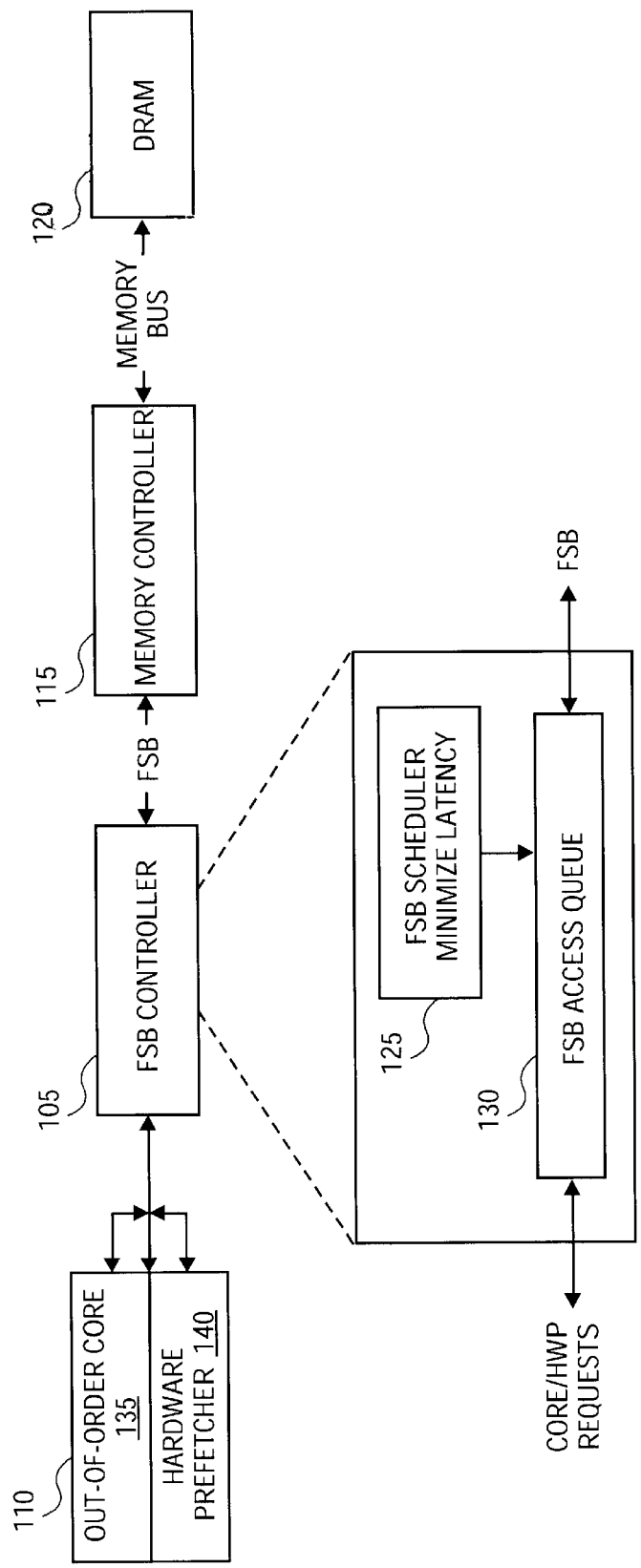
FIG. 1 illustrates a front side bus (FSB) controller that schedules memory accesses according to a prior art embodiment.
Figure 2A:
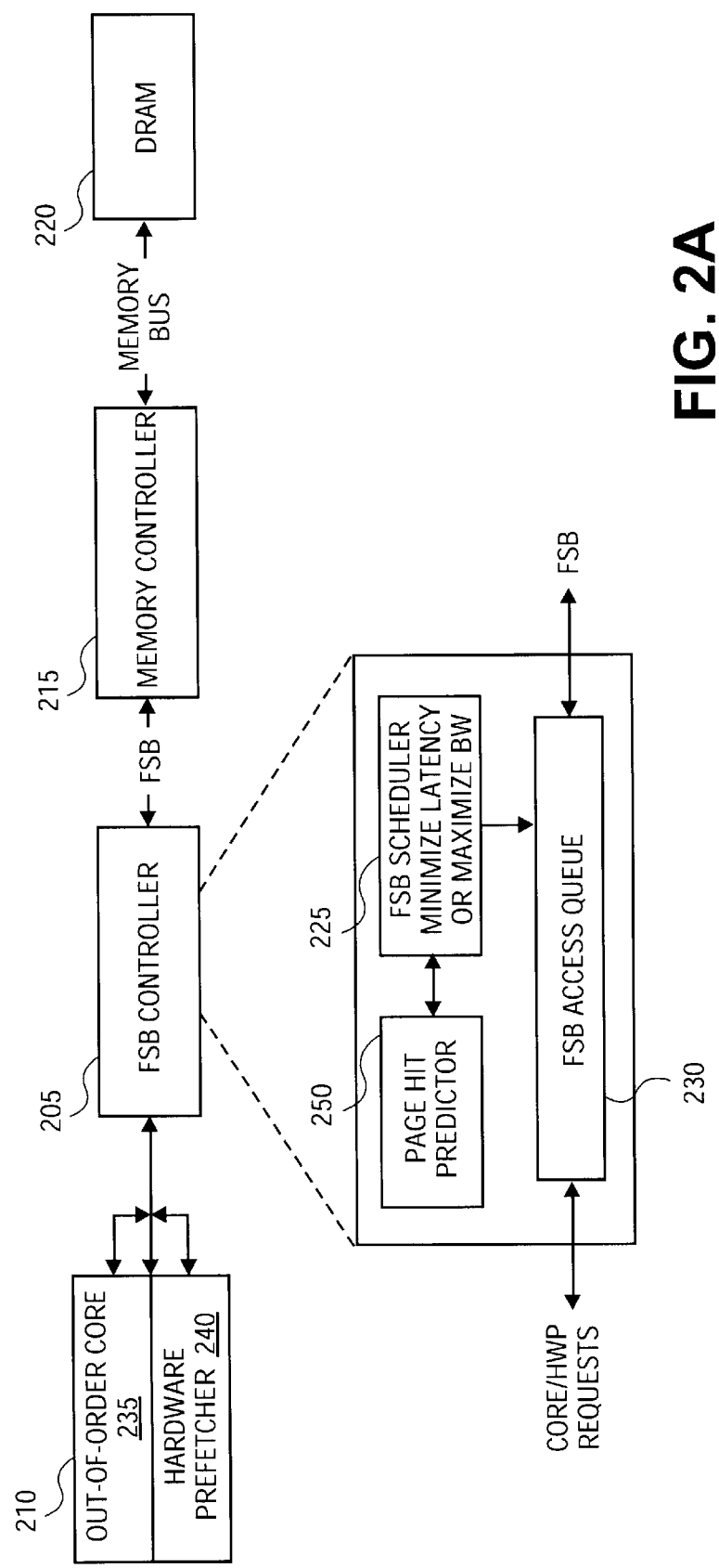
FIG. 2A illustrates a front side bus (FSB) controller that schedules memory accesses according to one embodiment of the invention.

FIG. 2A illustrates a front side bus (FSB) controller that schedules memory accesses according to one embodiment of the invention. As illustrated in the embodiment of FIG. 2A, the FSB controller 205 includes a FSB scheduler 225 that schedules DRAM accesses from a processor 210 to DRAM 220 using a FSB access queue 230. The FSB controller is coupled to processor 210 via a L2 miss request bus and to memory controller 215 via a FSB. The memory controller 215 is coupled to DRAM 220 via a memory bus. Processor 210 comprises an out-of-order core 235 and a hardware prefetcher (HWP) 240. The out-of-order core 235 uses a pipelining technique wherein multiple instructions are overlapped in execution in an effort to improve the overall performance of the processor. The HWP prefetches DRAM accesses that are predicted to be eventually needed by execution units in the out-of-order core.

The FSB controller 205 comprises a FSB scheduler 225 and a DRAM page open predictor 250. In one embodiment, the FSB scheduler 225 is coupled to the DRAM page open predictor 250, and the FSB scheduler is coupled to a FSB access queue 230. Alternate embodiments may have both the DRAM page open predictor and the FSB scheduler coupled to the FSB access queue 230. In one embodiment, the FSB scheduler 225 schedules accesses from the processor 210 (i.e., from the out-of-order core and from the HWP) to DRAM based upon the application, or portions of the application, that is being processed by the processor. For example, if the application being processed is latency tolerant, the FSB scheduler 225 schedules memory accesses for maximizing the memory bus bandwidth. Alternately, if the application being processed is latency intolerant, the FSB scheduler 225 schedules memory accesses to minimize memory access latency. In other words, the FSB scheduler arranges memory accesses in the FSB access queue 230 based upon the characteristics of the application being processed by processor 210. An application may be latency intolerant e.g., when a memory access is needed to resolve a branch misprediction and therefore the speculative work performed by the core when a branch is mispredicted is useless until the memory access is complete and the processor fetches instructions from the correct branch of program execution. In order to determine whether an application is "latency tolerant" or "latency intolerant", the FSB scheduler 225 monitors the memory accesses generated by the HWP 240 and by the out-of-order core 235. The FSB does this by monitoring the entries in the FSB access queue 230.

FIG. 2B illustrates parameters associated with memory accesses according to one embodiment of the invention. As FIG. 2B illustrates, each DRAM access (entry) in the FSB access queue 230 has associated with it at least the following information: a) The instruction number e.g., the program instruction number, 260, of the DRAM access (i.e., the elapsed time since the DRAM access was generated); b) The memory address, 262, of the DRAM access; c) A number, 264, indicating the position of the DRAM access in the FSB queue (older accesses are placed higher in the queue hierarchy than later instructions); d) A flag, 266, that indicates whether the access was created by the out-of-order core or by the HWP; e) A flag, 268, that indicates whether the entry created by the HWP was also generated/used by the core; f) A flag, 270, that indicates whether the access is predicted to access an open DRAM page; and g) A flag, 272, that indicates whether the memory access is for reading or writing memory.

In one embodiment of the invention, if a majority of the memory accesses scheduled by the FSB scheduler on to the memory bus are generated by the HWP 240, determined by checking whether flag 268 is set, and if the majority of these generated accesses are utilized by the out-of-order core 235, determined by checking whether flag 266 is set, then the application is determined to be latency tolerant. For a latency tolerant application, in one embodiment of the invention, the FSB scheduler 225 may re-order the entries in the FSB queue 230 for maximizing the memory bus bandwidth. This means that the FSB scheduler prioritizes DRAM accesses that are predicted to access data from the same DRAM page. In the embodiment of FIG. 2B, in the maximize bandwidth mode the FSB scheduler schedules memory accesses in accordance with the following queue entries 1, 6, 7, 4, 0, 8, 9, 11, 2, 12, 5, and 3. Thus, accesses by the out-of-order-core have priority over accesses by the HWP for accessing open DRAM pages. However, in the minimize latency mode the FSB scheduler schedules memory accesses in accordance with the following queue entries 5, 3, 1, 6, 7, 4, 0, 8, 9, 11, 2, and 12. Thus, older instructions from the core are scheduled by older instructions from the HWP regardless of whether a DRAM page is open. Details of this are provided with respect to FIG. 3 below.

In order to schedule DRAM accesses that are predicted to access data from an open DRAM page, the FSB scheduler 225 utilizes the DRAM page open predictor 250. In one embodiment, the DRAM page open predictor keeps track of the history of DRAM pages that are accessed, and based on the history of the DRAM pages that are accessed, the DRAM page open predictor 250 generates a list of DRAM pages predicted to be open in DRAM. For example, if DRAM pages 12, 14, 16 and 18 were accessed in the past, and the memory system allows for 4 DRAM pages to be simultaneously open, then the DRAM page open predictor predicts that a new access to page 12 will hit, and a new access to page 13 will miss. In one embodiment of the invention, the DRAM page open predictor 250 generates or updates the list of DRAM pages predicted to be open in DRAM at least every memory bus cycle, in other embodiments, the DRAM page open predictor may generate or update the list of DRAM pages predicted to be open in DRAM every few (e.g., 2 or more) memory bus cycles. In one embodiment, the memory controller may send the list of open DRAM pages to the DRAM page open predictor over the FSB. In another embodiment, the memory controller is on the processor core and therefore the list of open DRAM pages, needed by the memory controller, can be utilized as the DRAM page open predictor. In another embodiment, the memory controller predicts which DRAM pages may be speculatively opened based on previous access patterns. For example, the memory controller may use an algorithm (e.g., a curve fit algorithm) that uses the addresses of previously opened DRAM pages to predict future DRAM pages that may be opened. The DRAM page open predictor can be made aware of this algorithm (e.g., by programming the DRAM page open predictor at the time of manufacture), and infer from the accesses being sent to the memory controller which pages the memory controller will speculatively open. This eliminates the need for the memory controller to send the list of DRAM pages that are predicted to be open to the DRAM page open predictor. In one embodiment of the invention, the FSB scheduler uses the list of DRAM pages predicted to be open, generated by the DRAM page hit predictor, to set flag 270 for each memory access.

Figure 3:
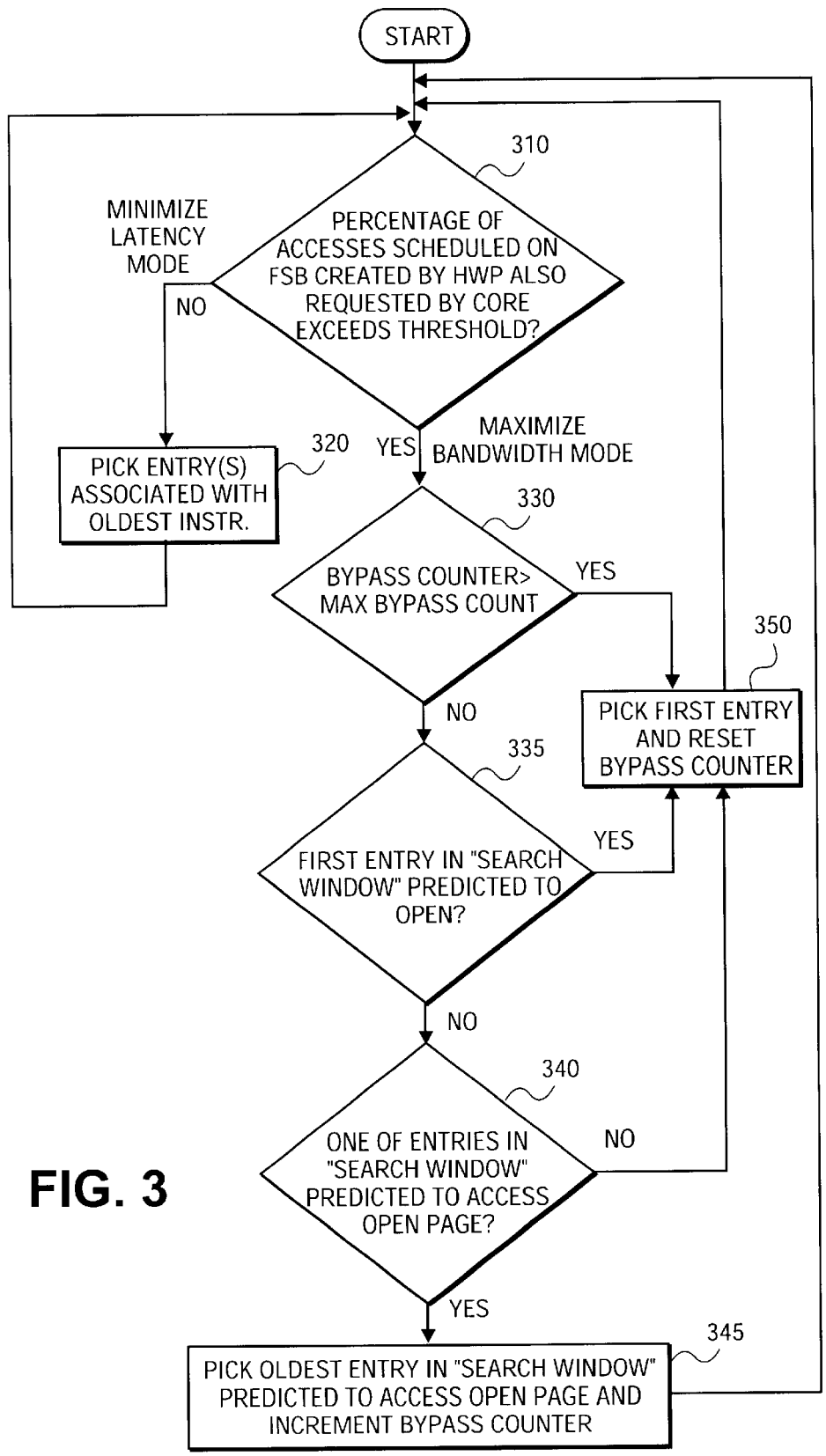
FIG. 3 illustrates a flow diagram of memory accesses according to one embodiment of the invention.

FIG. 3 illustrates a flow diagram of memory accesses according to one embodiment of the invention. The DRAM page open predictor may predict the DRAM accesses that will access open DRAM pages and the accesses that will access closed DRAM pages. Using this information (i.e., if a DRAM access is predicted to access an open page) the FSB scheduler sets flag 270 (i.e., the predicted DRAM page open flag) for entries in the FSB access queue.

At 310, the FSB scheduler determines if the HWP generates most of the DRAM accesses utilized by the out-of-order core. In one embodiment of the invention, determining whether the HWP generates most of the DRAM accesses utilized by the out-of-order core implies determining whether flags 266 and 268 are set in some unit time interval. In another embodiment of the invention, determining whether the HWP generates most of the DRAM accesses utilized by the out-of-order core implies determining whether the percentage of accesses that have both flags 266 and 268 set exceeds some threshold e.g., a programmable percentage. In one embodiment of the invention, the programmable percentage is programmed at the time of manufacture of the FSB controller. In alternate embodiments, the programmable percentage is programmed by a user or automatically by the program being executed. In one embodiment of the invention, when the HWP generates the DRAM access, the flag 266 is set (e.g., by the HWP) indicating that the HWP generated the DRAM access. Subsequently, if the out-of-order core also generates the same DRAM access, flag 268 is set (e.g., by the out-of-order core), indicating the out-of-order core utilized the access generated by the HWP. Thus, by monitoring flags 266 and 268 for DRAM accesses in the FSB queue, the following may be inferred if both flags are set for most DRAM accesses: 1) The HWP is generating the required DRAM accesses, and 2) The HWP is not generating unused DRAM accesses. Based at least upon conditions 1) and 2) above it may be inferred that the memory bus is saturated. This assumption is based upon the fact that the HWP requests entering the FSB queue are stalled in the FSB queue long enough such that the out-of-order core then generates the same DRAM access.

If the conditions described above are met, the application may be described as latency tolerant and the bandwidth of the memory bus may be assumed to be constrained. Once the FSB scheduler determines that the application being processed is latency tolerant and that the bandwidth of the memory bus is constrained, the FSB scheduler switches to maximize bus bandwidth mode. Otherwise, the FSB scheduler assumes that the application being processed is not latency tolerant and switches to the minimize latency mode. In one embodiment of the invention, if the FSB scheduler is in the maximize bus bandwidth mode, the FSB scheduler reorders the entries in the FSB access queue to maximize the memory bus bandwidth.

In the minimize latency mode, at 320, the FSB scheduler schedules FSB accesses such that the memory accesses that are generated by earlier instructions in the out-of-order core are scheduled to access DRAM before accesses generated by later instructions. Also, the FSB scheduler schedules DRAM accesses generated by the out-of-order core before DRAM accesses generated by the HWP. In the minimize latency mode when scheduling entries that are earliest in time (i.e., accesses associated with the oldest instruction in the FSB queue), the FSB scheduler does not consider whether entries in the FSB access queue are accessed from the same DRAM page or from different DRAM pages.

When in maximize bandwidth mode, the FSB scheduler searches the FSB access queue for an entry associated with the oldest instruction (instructions from the out-of-order core have priority over instructions from the HWP) that is predicted to access an open DRAM page. In one embodiment of the invention, there are 2 parameters used when performing this search. The first parameter, the "search window size", describes how many entries will be searched when searching for an entry that accesses an open DRAM page. Starting with the list of entries, sorted (e.g., when the entries are entered into the FSB queue) by the age of the instruction associated with the entry (older instruction first), the FSB scheduler searches the "search window size" entries on this list for an access that is predicted to access an open DRAM page. If none of the "search window size" entries are predicted to access an open DRAM page, then the first entry on the list is scheduled.

The second parameter, the "Max Bypass Count", determines how many entries are allowed to bypass the first entry on the list, before the first entry on the list is chosen even though it is predicted to access a closed DRAM page. If an entry is scheduled that is not the first entry on the list, a "Bypass Counter" is incremented. If the first entry on the list is chosen, the "Bypass Counter" is reset to 0. If the value of the Bypass Counter is greater than or equal to the "Max Bypass Count", the first entry on the list is chosen event though it is predicted to access a closed DRAM page (resetting the Bypass Counter to 0). In one embodiment of the invention, the maximum bypass count, and the search window size may be programmed e.g., at the time of manufacture of the FSB scheduler.

In the maximize bandwidth mode, at 330, a determination is made whether the bypass counter is greater than the bypass count. If the bypass counter is greater than the bypass count then at 350, the first entry in the FSB is scheduled for a DRAM access and the bypass counter is reset e.g., to 0. If at 330, the value of the bypass counter is not greater than the maximum bypass count, at 335, a determination is made whether the first entry in the search window (the search window is defined as the entries in the FSB access queue equal to the search window size) is predicted to access an open DRAM page. If the first entry in the search window is predicted to access an open DRAM page at, 350, the FSB scheduler schedules the first entry for a DRAM access and the bypass counter is reset.

However, if the first entry in the search window is not predicted to access an open DRAM page, at 340, a determination is made whether any of the entries in the search window in the FSB access queue is predicted to access an open DRAM page. If none of the entries in the search window is predicted to access an open DRAM page at 350 the first entry in the FSB access queue is scheduled. However, if at 340 at least one of the entries in the search window is predicted to access an open DRAM page, at 345, the FSB scheduler schedules oldest entry in the search window that is predicted to access an open DRAM page and increments the bypass counter.

In one embodiment of the invention, if the FSB scheduler schedules DRAM accesses in the maximize bus bandwidth mode, and if the FSB scheduler determines that the percentage of accesses that are scheduled on the FSB access queue are generated by the HWP and requested by the out-of-order core are below the threshold percentage, the FSB scheduler automatically changes the mode of scheduling DRAM accesses from the maximize bus bandwidth mode to the minimize latency mode. So also, if the FSB scheduler schedules DRAM access in the minimize latency mode, and if the FSB scheduler determines that the percentage of accesses that are scheduled on the FSB access queue are created by the HWP and requested by the out-of-order core are equal to or above the threshold percentage the FSB scheduler automatically changes the mode of scheduling DRAM accesses from the minimize latency mode to the maximize bus bandwidth mode. Thus, the change of modes from one to the other is done dynamically (i.e., on-the-fly) based upon the application or portion thereof being processed.

Although the embodiment of FIG. 3 accesses DRAM, alternate embodiments may access other types of memory e.g., Synchronous DRAM etc. Although the embodiment described illustrates the FSB controller as a separate device, in other embodiments, a processor or even a memory controller may incorporate the functionality of the FSB controller described with respect to FIG. 3.

Figure 4:
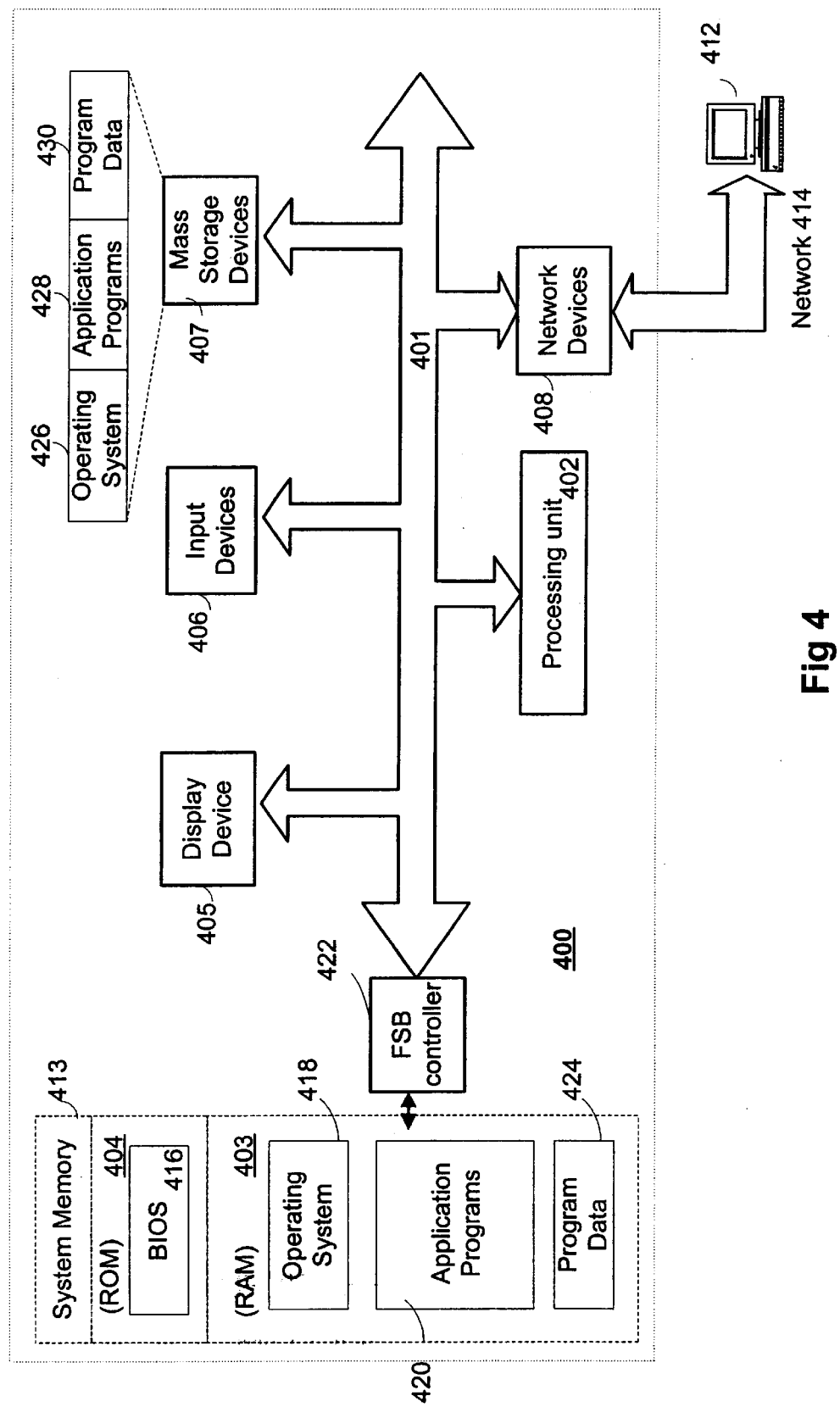
FIG. 4 illustrates one embodiment of a computer system in which the present invention operates.

FIG. 4 illustrates one embodiment of a computer system in which the present invention operates. In general, the computer system 400 illustrated by FIG. 4 includes a processing unit 402 (e.g., a microprocessor) coupled through a bus 401 to a system memory 413. System memory 413 comprises a read only memory (ROM) 404 and a random access memory (RAM) 403. ROM 404 comprises Basic Input Output System (BIOS) 416, and RAM 403 comprises operating system 418, application programs 420, and program data 424. Processing unit 402 communicates with system memory 413 via FSB controller 422, and FSB controller 422 communicates with system memory 413 via a memory controller (not shown). The FSB controller 422 operates in accordance with the flow diagram described with respect to FIG. 3.

Computer system 400 includes mass storage devices 407, input devices 406 and display device 405 coupled to processing unit 402 via bus 401. Mass storage devices 407 represent a persistent data storage device, such as a floppy disk drive, fixed disk drive (e.g., magnetic, optical, magneto-optical, or the like), or streaming tape drive. Mass storage devices store program data including application programs 428 and operating system 426. Processing unit 402 may be any of a wide variety of general purpose processors or microprocessors (such as the Pentium® family of processors manufactured by Intel® Corporation), a special purpose processor, or even a specifically programmed logic device.

Display device 405, provides graphical output for computer system 400. Input devices 406, such as a keyboard or mouse, may be coupled to bus 401 for communicating information and command selections to processing unit 402. Also coupled to processing unit 402 through bus 401 are one or more network devices 408 that can be used to control and transfer data to electronic devices (printers, other computers, etc.) connected to computer system 400. Network devices 408 also connect computer system 400 to a network, and may include Ethernet devices, phone jacks, and satellite links.

Thus, a method and apparatus have been disclosed to control memory accesses. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
    monitoring memory accesses generated by a hardware prefetcher;
    determining whether the memory accesses from the hardware prefetcher are used by an out-of-order core; and
    switching memory accesses from a first mode to a second mode if a percentage of the memory accesses generated by the hardware prefetcher are used by the out-of-order core, wherein the first mode comprises memory accesses to minimize memory access latency, and the second mode comprises memory accesses to maximize memory bus bandwidth.

2. The method of claim 1 wherein the percentage of the memory accesses generated by the hardware prefetcher that is used by the out-of-order core is at least 50 percent in a unit time.

3. The method of claim 1 wherein the minimize memory access latency mode comprises front side bus scheduler first scheduling memory accesses that are generated by earlier instructions.

4. The method of claim 3 wherein accesses from the out-of-order core are scheduled before accesses from the hardware prefetcher.

5. The method of claim 1 wherein the maximizing memory bus bandwidth mode comprises front side bus scheduler scheduling memory accesses that are predicted to access data from an open memory page.

6. The method of claim 5 further comprising the front side bus scheduler searching a predetermined number of entries in the front side bus access queue to find entries that are predicted to access data from an open memory page, prior to scheduling the first entry in the front side bus access queue.

7. The method of claim 1 further comprising:
    switching from the minimize memory access latency mode to the maximize memory bus bandwidth mode if more than 50 percent of the memory accesses generated by the hardware prefetcher in unit time are used by the out-of-order;
    monitoring memory accesses generated by a hardware prefetcher;
    determining whether the memory accesses from the hardware prefetcher are used by an out-of-order core; and
    switching memory accesses from a first mode to a second mode if a percentage of the memory accesses generated by the hardware prefetcher are used by the out-of-order core.

8. A computer system comprising:
    a bus;
    a processor coupled to the bus;
    a front side bus controller coupled to the bus, said front side bus controller comprising a page open predictor, and a front side bus scheduler, said front side bus scheduler to switch from a minimize memory access latency mode to a maximize memory bus bandwidth mode, said front side bus scheduler coupled to the page open predictor, wherein
        the page open predictor predicts memory accesses that are likely to occur from a page in memory; and
        the front side bus scheduler switches from the minimize memory access latency mode to the maximize memory bus bandwidth mode if more than 50 percent of the memory accesses generated by a hardware prefetcher in a unit time are used by an out-of-order core; and
    a front side bus access queue, coupled to the front side bus scheduler, to contain memory accesses.

9. The computer system of claim 8 wherein the processor comprises an out-of-order core and a hardware prefetcher.

10. The computer system of claim 8 wherein the minimizing memory access latency mode comprises the front side bus scheduler to first schedule memory accesses generated by earlier instructions.

11. The computer system of claim 8 wherein maximizing memory bus bandwidth mode comprises the front side bus scheduler to schedule memory accesses that are predicted to access data from an open memory page.

12. The computer system of claim 11 wherein the front side bus scheduler switches from the minimize memory access latency mode to the maximize memory bus bandwidth mode dynamically.

13. The computer system of claim 8 wherein in the maximizing bus bandwidth mode the front side bus scheduler searches a predetermined number of entries in the front side bus access queue to find entries that are predicted to access data from an open memory page, prior to scheduling a first entry in the front side bus access queue.

14. A computer system comprising:
    a bus;
    a processor coupled to the bus;
    a front side bus controller coupled to the bus, said front side bus controller comprising a page open predictor and a front side bus scheduler, said front side bus scheduler to switch memory access modes from a minimize memory access latency mode to a maximize memory bus bandwidth mode, wherein the front side bus scheduler switches from the maximize memory bus bandwidth mode to the manimize memory bus access latency mode if less than 50 percent of the memory accesses generated by a hardware prefetcher in a unit time are used by an out-of-order core, the front side bus scheduler coupled to the page open predictor, wherein the page open predictor predicts memory accesses that are likely to occur from a page in memory; and a front side bus access queue, coupled to the front side bus scheduler, to contain memory accesses.

* * * * *